(12) United States Patent
Choi

(10) Patent No.: US 9,030,183 B2
(45) Date of Patent: May 12, 2015

(54) SOFT-START CONTROL TECHNIQUES FOR A SWITCHED-MODE POWER SUPPLY

(75) Inventor: Hangseok Choi, Bedford, NH (US)

(73) Assignee: Fairchild Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/508,615

(22) PCT Filed: Apr. 25, 2012

(86) PCT No.: PCT/US2012/034934
§ 371 (c)(1),
(2), (4) Date: Oct. 10, 2012

(87) PCT Pub. No.: WO2012/148977
PCT Pub. Date: Nov. 1, 2012

(65) Prior Publication Data
US 2014/0042994 A1    Feb. 13, 2014

Related U.S. Application Data

(60) Provisional application No. 61/478,724, filed on Apr. 25, 2011.

(51) Int. Cl.
*G05F 1/00* (2006.01)
*H02M 3/02* (2006.01)
*H02M 1/36* (2007.01)
(Continued)

(52) U.S. Cl.
CPC *H02M 3/02* (2013.01); *H02M 1/36* (2013.01); *H02M 3/156* (2013.01); *H02M 3/335* (2013.01)

(58) Field of Classification Search
CPC .................................. G05F 5/569; G05F 1/575

USPC ................................. 323/223, 225, 282, 285
See application file for complete search history.

(56) References Cited

U.S. PATENT DOCUMENTS 4,621,313 A    11/1986  Kiteley
5,499,154 A     3/1996  Cullison
(Continued)

FOREIGN PATENT DOCUMENTS

| CN | 101373926 | 2/2009 |
|---|---|---|
| CN | 101841239 | 9/2010 |
| JP | 2010259188 | 11/2010 |

OTHER PUBLICATIONS

International Search Report and Written Opinion dated Aug. 7, 2012 issued in PCT Patent Application No. PCT/US2012/034934, 10 pages.

*Primary Examiner* — Matthew Nguyen
(74) *Attorney, Agent, or Firm* — Grossman Tucker Perreault & Pfleger PLLC

(57) ABSTRACT

A power supply system including switched-mode power supply circuitry configured to generate a DC output voltage from a DC input voltage and soft-start feedback circuitry configured to control the switched-mode power supply circuitry to generate a predefined output voltage during a soft-start period of operation. The soft-start feedback circuitry includes a controllable current source configured to generate a reference current and a reference voltage, wherein the reference current is based on a difference between the reference voltage and a feedback voltage proportional to the output voltage, and amplifier circuitry configured to compare the feedback voltage with the reference voltage and generate a control signal to control the operation of the switched-mode power supply during a soft-start period of operation.

20 Claims, 3 Drawing Sheets

(51) Int. Cl.
*H02M 3/156* (2006.01)
*H02M 3/335* (2006.01)

(56) References Cited

U.S. PATENT DOCUMENTS

| | | |
|---|---|---|
| 5,502,370 A | 3/1996 | Hall et al. |
| 5,675,485 A | 10/1997 | Seong |
| 6,377,480 B1 * | 4/2002 | Sase et al. ............ 363/49 |
| 6,552,517 B1 * | 4/2003 | Ribellino et al. ......... 323/282 |
| 7,218,080 B2 * | 5/2007 | Yang ............... 323/222 |
| 7,719,243 B1 | 5/2010 | Balogh |
| 8,598,800 B2 * | 12/2013 | Uchimoto et al. ........... 315/247 |
| 2011/0006746 A1 * | 1/2011 | Lu et al. ............ 323/288 |
| 2011/0181262 A1 * | 7/2011 | Deguchi ............ 323/284 |
| 2013/0265807 A1 * | 10/2013 | Lee et al. ............ 363/49 |

* cited by examiner

SOFT-START CONTROL TECHNIQUES FOR A SWITCHED-MODE POWER SUPPLY

CROSS-REFERENCE TO RELATED APPLICATION

This application is a National Stage of International PCT Application No. PCT/US2012/034934 filed on Apr. 25, 2012, which claims the benefit of U.S. Provisional Patent Application Ser. No. 61/478,724 filed on Apr. 25, 2011, both of which are fully incorporated herein by reference.

FIELD

The present disclosure relates to switched-mode power supplies, and more particularly, to soft-start control techniques for a switched mode power supply.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure provides soft-start control techniques for a power supply. The control techniques may be utilized to prevent saturation of a soft-start feedback amplifier and maintain the controllability of the feedback loop. In one feedback control technique, a voltage amplifier is used to generate a feedback control signal, to control the power supply, based on the output voltage of the power supply and a reference voltage. The reference voltage is generated using a controllable current source, and the output of the controllable current source is adaptively adjusted based on the output voltage of the power supply and the reference voltage. In another feedback control technique, a transconductance amplifier is used instead of a voltage amplifier. By controlling the input to the amplifier, saturation of the error amplifier is avoided and the response time of the feedback loop is increased. These techniques may enable, for example, full control over the power supply output voltage during a soft-start period to prevent a voltage drop when the power supply is loaded and to prevent an output voltage overshoot at lighter output loads.

Figure 1:
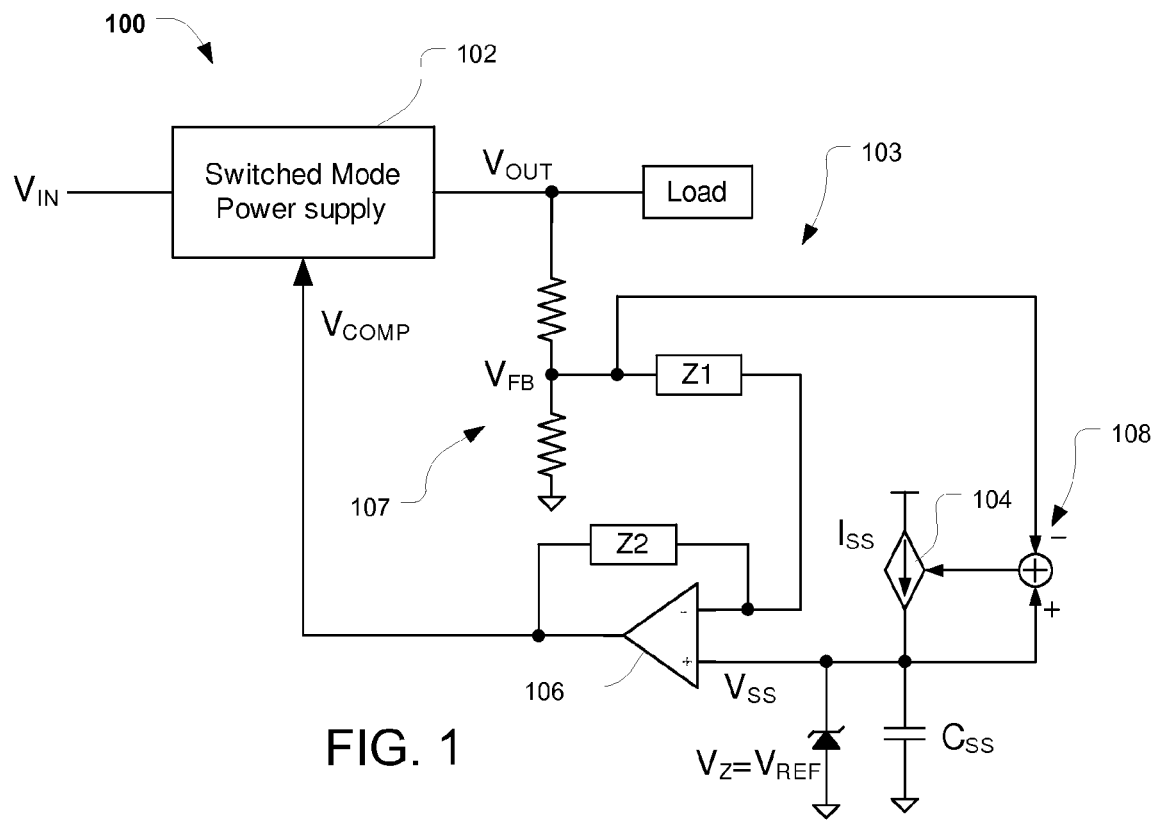
FIG. 1 illustrates a power supply system consistent with one embodiment of the present disclosure.

FIG. 1 illustrates a power supply system 100 consistent with one embodiment of the present disclosure. The power supply system 100 of FIG. 1 includes switched-mode power supply circuitry 102 generally configured as a DC/DC converter to provide an output voltage (Vout) from an input voltage (Vin) to supply power to a load (Load). The switched-mode power supply circuitry 102 may include a Buck converter circuitry, boost converter circuitry, buck-boost converter circuitry, flyback converter circuitry, SEPIC converter circuitry, etc., and/or any other known or after-developed switched-mode power supply circuit topologies. The power supply system 100 also includes soft-start feedback circuitry, generally depicted at 103. As is known, soft-start is the process of actively controlling the power supply so that the rise of the output voltage rise occurs at a relatively constant rate at power on. Accordingly, the soft-start circuitry 103 is configured to generate a control signal VCOMP based on the output voltage (VOUT) and a reference voltage, as will be described in greater detail below.

The soft-start feedback circuitry 103 includes controllable current source circuitry 104 configured to generate a controllable current ISS and voltage amplifier circuitry 106. The voltage amplifier circuitry 106 is configured to receive feedback voltage (VFB) indicative of, or proportional to, the output voltage (VOUT) of the power supply circuitry 102. For example, the soft-start feedback circuitry 103 may include voltage divider circuitry 107 coupled to the DC output voltage (VOUT) and configured to generate the feedback voltage (VFB). The amplifier circuitry 106 is configured to compare the feedback voltage (VFB) with a reference voltage (VSS) generated by the current source circuitry 104 through the soft-start capacitor CSS and the Zener diode tied to ground (or reference) potential. In this embodiment, the current, ISS, generated by the current source circuitry 104 is controlled by the feedback voltage (VFB) and the reference voltage (VSS), depicted at summing node 108. In this example, VSS operates as positive feedback control and VFB operates as negative feedback control. Thus, increases in VFB (indicative of an increase in the output voltage VOUT) will cause ISS, and thus VSS, to decrease, to prevent saturation of the amplifier 106.

Figure 2:
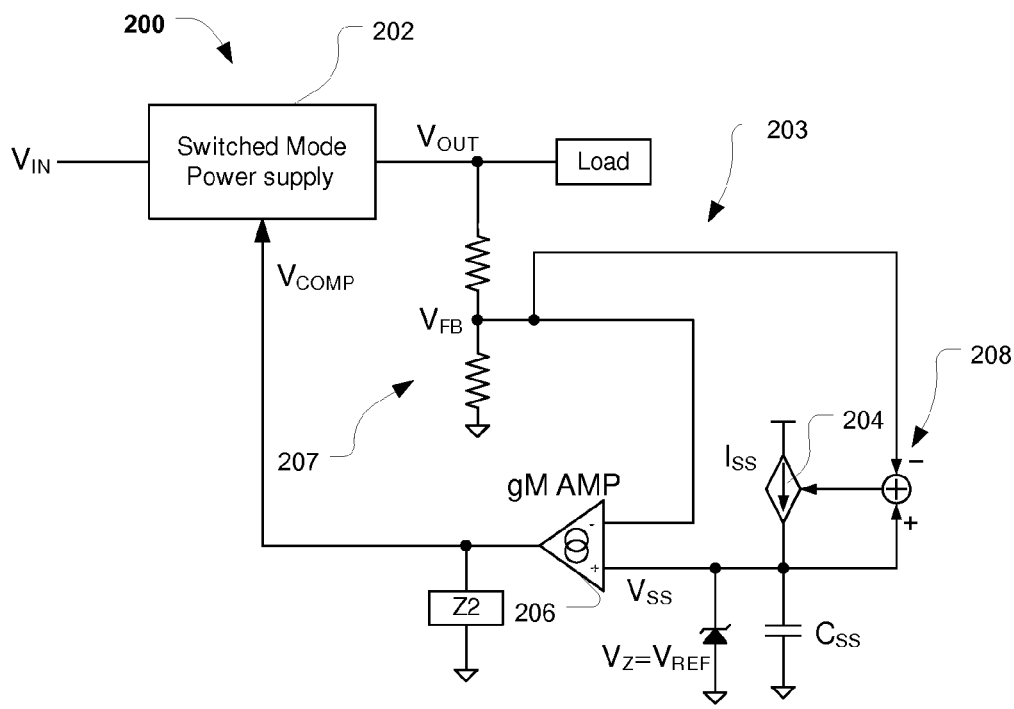
FIG. 2 illustrates a power supply system consistent with another embodiment of the present disclosure.

FIG. 2 illustrates a power supply system 200 consistent with another embodiment of the present disclosure. The power supply system 200 of this embodiment is similar to the power supply system 100 of the previous embodiment, however, instead of voltage feedback control, the present embodiment uses current feedback control via transconductance (gM) amplifier circuitry 206. The soft-start feedback circuitry 203 includes controllable current source circuitry 204 configured to generate a controllable current ISS and current amplifier circuitry 206. The current amplifier circuitry 206 is configured to receive feedback voltage (VFB) indicative of, or proportional to, the output voltage (VOUT) of the power supply circuitry 202. For example, the soft-start feedback circuitry 203 may include voltage divider circuitry 207 coupled to the DC output voltage (VOUT) and configured to generate the feedback voltage (VFB). The amplifier circuitry 206 is configured to compare the feedback voltage (VFB) with a reference voltage (VSS) generated by the current source circuitry 204 through the soft-start capacitor CSS and the Zener diode tied to ground (or reference) potential. In this embodiment, the current, ISS, generated by the current source circuitry 204 is controlled by the feedback voltage (VFB) and the reference voltage (VSS), depicted at summing node 208. In this example, VSS operates as positive feedback control and VFB operates as negative feedback control. Thus, increases in VFB (indicative of an increase in the output voltage VOUT) will cause ISS, and thus VSS, to decrease, to prevent saturation of the amplifier 206.

In either of the foregoing embodiments, the output of the amplifier, VCOMP, may be used to control the power supply circuitry to adjust VOUT. For example, the power supply circuitry 102/202 may include pulse width modulation (PWM) circuitry and VCOMP may be used to adjust the duty cycle of the PWM signals to adjust the power delivered to the load. In another example, the power supply circuitry 102/202 may include pulse frequency modulation (PFM) circuitry and VCOMP may be used to adjust the pulse rate of the modulated signals to adjust the power delivered to the load.

Figure 3:
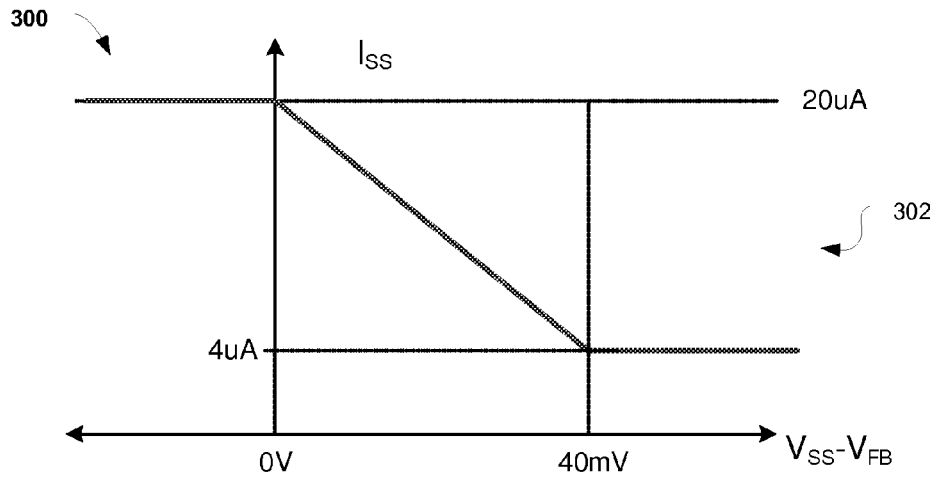
FIG. 3 illustrates a voltage/current waveform in connection with the operation of the amplifier of the embodiment of FIG. 1 or FIG. 2.

FIG. 3 illustrates a voltage/current waveform 300 in connection with the operation of the amplifier circuitry of the embodiment of FIG. 1 and/or FIG. 2. In particular, waveform 300 illustrates the soft-start current ISS as a function of the soft-start voltage (VSS) and the feedback voltage (VFB). As VSS-VFB increases, the value of ISS decreases, so that the amplifier circuitry operates in a non-saturated range. In this example, as VSS-VFB increases from 0 Volts to 40 mV, ISS decreases from 20 uA to 4 uA. Of course, these values are provided only as an example, and not as a limitation.

Figure 4:
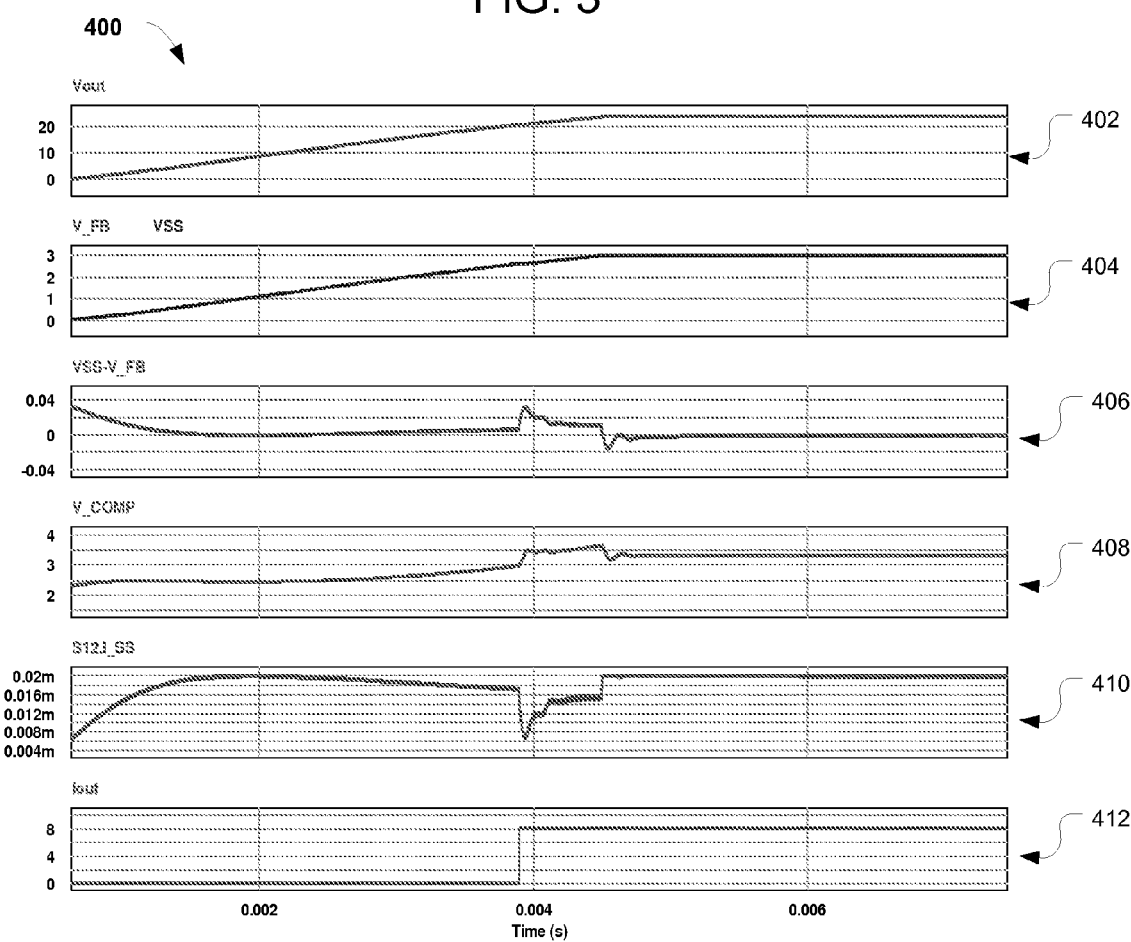
FIG. 4 illustrates timing diagrams of various signals in connection with the operation of the power supply system of FIG. 1 or FIG. 2.

FIG. 4 illustrates timing diagrams 400 of various signals in connection with the operation of the power supply system of FIG. 1 and/or FIG. 2. Waveform 402 is the output voltage VOUT during a soft start period of the power supply. Irrespective of load conditions, VOUT slowly ramps up, and remains constant once the target voltage level is reached. Waveform 404 is the feedback voltage VFB and the soft start reference voltage VSS. In this example, these signals generally coincide, indicating that the output voltage is tracking the reference voltage to a fairly high degree of accuracy. Waveform 406 is VSS-VFB, which is the voltage at the summing node 108/208. Waveform 408 is the control signal VCOMP generated by the amplifier circuitry 106/206. Waveform 410 is ISS current, and waveform 412 is the output current IOUT.

Figure 5:
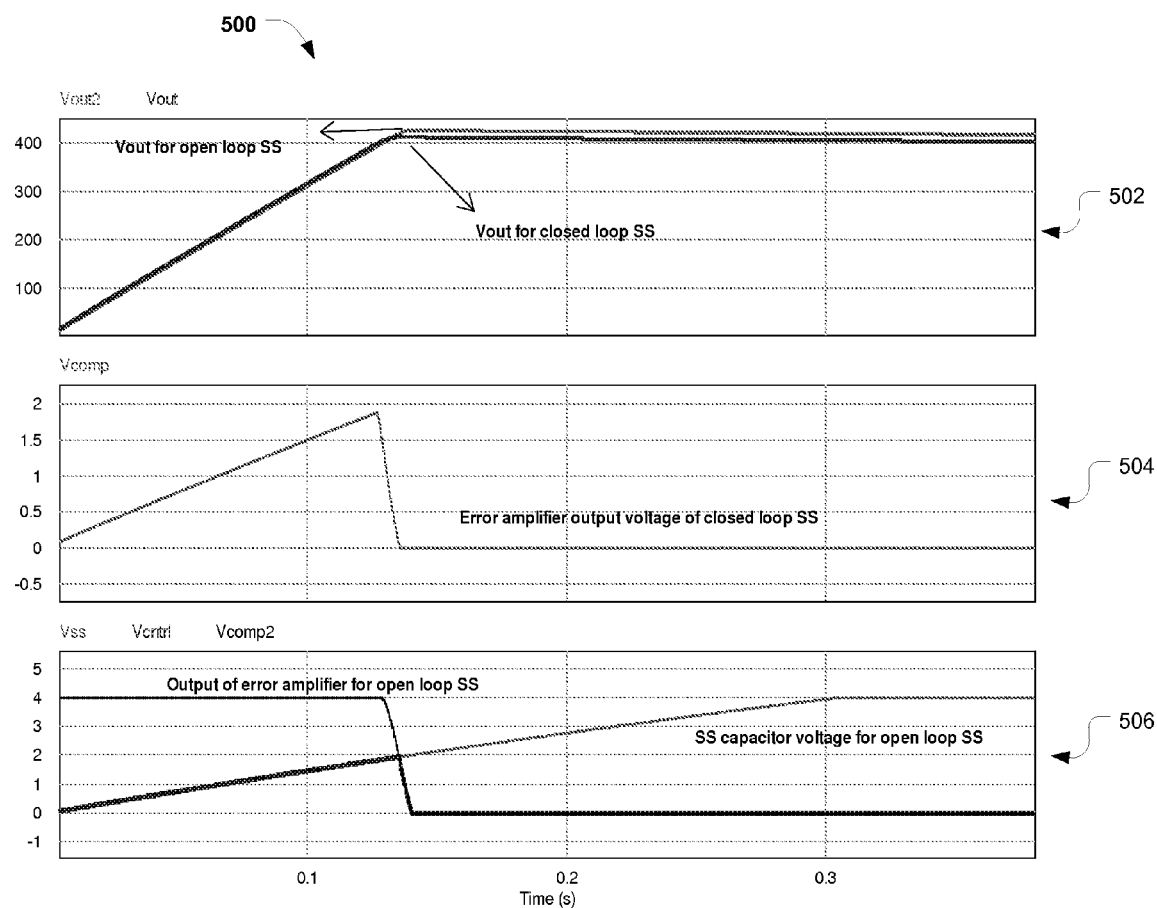
FIG. 5 illustrates comparative timing diagrams of various signals in connection with the operation of the power supply system of FIG. 1 or FIG. 2 compared to a conventional open loop soft-start control technique.

FIG. 5 illustrates comparative timing diagrams of various signals in connection with the operation of the power supply system of FIG. 1 or FIG. 2 compared to a conventional open loop soft-start control technique. Waveform 502 depicts the output voltage (VOUT2) for open loop soft-start control and VOUT using the closed-loop control techniques depicted in FIGS. 1 and/or 2. Note that VOUT2 is greater than VOUT, indicating that open loop control may have output voltage overshoot. Waveform 504 depicts the output of the error amplifier 106/108, indicating that the output operates in a relatively small voltage range (approximately 0-2 Volts), as opposed to waveform 506 which depicts the output of an amplifier used in an open-loop control technique in which the operating voltage range is much greater (e.g., 0-4 Volts). Operating an amplifier in the range depicted in waveform 506 may indicate that the amplifier is saturated, which decreases the controllability of the power supply system.

The term "circuitry" or "circuit", as used in any embodiment herein, may comprise, for example, singly or in any combination, hardwired circuitry, programmable circuitry, state machine circuitry, and/or circuitry that is included in a larger system, for example, elements that may be included in an integrated circuit.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A power supply system, comprising:
switched-mode power supply circuitry configured to generate a DC output voltage from a DC input voltage;
soft-start feedback circuitry configured to control the switched-mode power supply circuitry to generate a predefined output voltage during a soft-start period of operation, said soft-start feedback circuitry including a controllable current source configured to generate a reference current and a reference voltage, wherein the reference current is based on a difference between the reference voltage and a feedback voltage proportional to the output voltage, and amplifier circuitry configured to compare the feedback voltage with the reference voltage and generate a control signal to control the operation of the switched-mode power supply during the soft-start period of operation.

2. The power supply of claim 1, wherein the amplifier circuitry comprises voltage amplifier circuitry.

3. The power supply of claim 1, wherein the amplifier circuitry comprises current amplifier circuitry.

4. The power supply of claim 3, wherein the current amplifier circuitry includes transconductance (gM) amplifier circuitry.

5. The power supply of claim 1, wherein the soft-start feedback circuitry further comprises voltage divider circuitry coupled to the DC output voltage and configured to generate the feedback voltage.

6. The power supply of claim 1, wherein the soft-start feedback circuitry further comprises a soft-start capacitor coupled to the controllable current source, wherein the reference voltage is based on the voltage of the soft-start capacitor.

7. The power supply of claim 1, wherein the reference voltage operates as positive feedback control and the feedback voltage operates as negative feedback control such that an increase in the feedback voltage causes the reference voltage to decrease.

8. A method of controlling switched-mode power supply circuitry to generate a predefined DC output voltage during a soft-start period of operation, the method comprising:
generating a reference current and a reference voltage, wherein the reference current is based on a difference between the reference voltage and a feedback voltage proportional to the output voltage;
comparing the feedback voltage with the reference voltage to generate a control signal to control the operation of the switched-mode power supply during a soft-start period of operation; and
controlling switched-mode power supply circuitry based on said control signal to generate the predefined output voltage from a DC input voltage.

9. The method of claim 8, wherein the feedback voltage is compared with the reference voltage using voltage amplifier circuitry.

10. The method of claim 8, wherein the feedback voltage is compared with the reference voltage using current amplifier circuitry.

11. The method of claim 10, wherein the current amplifier circuitry includes transconductance (gM) amplifier circuitry.

12. The method of claim 8, wherein the feedback voltage is generated using voltage divider circuitry coupled to the DC output voltage.

13. The method of claim 8, wherein the reference current and the reference voltage is generated by a controllable current source.

14. The method of claim 13, wherein the reference voltage is based on the voltage of a soft-start capacitor coupled to the controllable current source.

15. The method of claim 8, wherein the reference voltage operates as positive feedback control and the feedback voltage operates as negative feedback control such that an increase in the feedback voltage causes the reference voltage to decrease.

16. A soft-start feedback circuitry for controlling switched-mode power supply circuitry to generate a predefined DC output voltage during a soft-start period of operation, the soft-start feedback circuitry comprising:
  a controllable current source configured to generate a reference current and a reference voltage, wherein the reference current is based on a difference between the reference voltage and a feedback voltage proportional to the output voltage; and
  amplifier circuitry configured to compare the feedback voltage with the reference voltage and generate a control signal to control the operation of the switched-mode power supply during the soft-start period of operation.

17. The soft-start feedback circuitry of claim 16, wherein the amplifier circuitry comprises voltage amplifier circuitry.

18. The soft-start feedback circuitry of claim 16, wherein the amplifier circuitry comprises current amplifier circuitry.

19. The soft-start feedback circuitry of claim 16, wherein the soft-start feedback circuitry further comprises voltage divider circuitry coupled to the DC output voltage and configured to generate the feedback voltage.

20. The soft-start feedback circuitry of claim 16, wherein the soft-start feedback circuitry further comprises a soft-start capacitor coupled to the controllable current source, wherein the reference voltage is based on the voltage of the soft-start capacitor.

* * * * *